(12) United States Patent
Sander

(10) Patent No.: US 8,031,399 B2
(45) Date of Patent: Oct. 4, 2011

(54) ILLUMINATION DEVICE FOR A LIGHT MICROSCOPE AND LIGHT MICROSCOPE WITH SUCH AN ILLUMINATION DEVICE

(75) Inventor: Ulrich Sander, Rebstein (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 497 days.

(21) Appl. No.: 12/259,646

(22) Filed: Oct. 28, 2008

(65) Prior Publication Data
US 2009/0109526 A1    Apr. 30, 2009

(30) Foreign Application Priority Data
Oct. 29, 2007 (DE) .......................... 10 2007 051 909

(51) Int. Cl.
G02B 13/10 (2006.01)
(52) U.S. Cl. ........................................ 359/433; 359/385
(58) Field of Classification Search .................... 359/433
See application file for complete search history.

(56) References Cited

U.S. PATENT DOCUMENTS

| | | | | | |
|---|---|---|---|---|---|
| 4,170,398 | A | * | 10/1979 | Koester | 359/219.1 |
| 4,241,257 | A | * | 12/1980 | Koester | 250/235 |
| 4,478,482 | A | * | 10/1984 | Koester | 359/201.1 |
| 5,510,892 | A | * | 4/1996 | Mizutani et al. | 356/139.1 |
| 5,748,367 | A | | 5/1998 | Luecke et al. | |
| 5,955,739 | A | * | 9/1999 | Kawashima | 250/548 |
| 5,993,002 | A | | 11/1999 | Steinhuber | |
| 6,081,614 | A | | 6/2000 | Yamada et al. | |
| 6,982,825 | B2 | | 1/2006 | Sander | |
| 2001/0010592 | A1 | | 8/2001 | Nakamura | |
| 2005/0012991 | A1 | | 1/2005 | Sander | |
| 2006/0098895 | A1 | * | 5/2006 | Westphal | 382/274 |

FOREIGN PATENT DOCUMENTS

| | | |
|---|---|---|
| AT | 20299 | 6/1905 |
| DE | 8016876 U1 | 11/1980 |
| DE | 19523712 A1 | 1/1996 |
| DE | 19855324 A1 | 6/2000 |

* cited by examiner

*Primary Examiner* — Arnel C Lavarias
(74) *Attorney, Agent, or Firm* — Hodgson Russ LLP

(57) ABSTRACT

An illumination device for a light microscope with an objective, in particular for a stereo-microscope, illuminates an object plane of the light microscope. An illumination beam path of the illumination device is defined by a light source, a field diaphragm, illumination optics with at least one illumination lens, and at least one deflection element. The object plane of the microscope is obliquely illuminated with incident illumination, wherein an axis of the illumination beam path forms an angle β greater than 0° with an optical axis of the objective. The field diaphragm, the illumination optics and the deflection element are arranged and orientated relative to one another such that a diaphragm plane which is defined by the field diaphragm, an illumination lens plane defined by the illumination lens, and an image plane of the image of the field diaphragm, which is produced by the illumination optics, without deflection by the deflection element, intersect at least approximately along a common straight line and that the image plane of the image of the field diaphragm which is produced by the illumination optics and which is deflected by the deflection element, runs in or parallel to the object plane. Sharp, undistorted imaging of the field diaphragm into the object plane or into a plane running parallel thereto is achieved.

17 Claims, 3 Drawing Sheets

ILLUMINATION DEVICE FOR A LIGHT MICROSCOPE AND LIGHT MICROSCOPE WITH SUCH AN ILLUMINATION DEVICE

CROSS-REFERENCE TO RELATED APPLICATIONS

This application claims priority of German patent application no. 10 2007 051 909.7 filed Oct. 29, 2007, which is incorporated by reference herein.

FIELD OF THE INVENTION

The invention relates to an illumination device for a light microscope, in particular a stereo microscope, as well as to a light microscope with such an illumination device.

BACKGROUND OF THE INVENTION

Illumination devices for light microscopes with incident illumination comprise a light source, a field diaphragm and illumination optics with which the field diaphragm is to be imaged into the region of the object. Basically the object field should be uniformly illuminated and have a sharp edge. This may be achieved by way of imaging the completely illuminated field diaphragm as accurately as possible into the object plane. The light source is for example a halogen lamp or LED. The illumination beam path may be led through the objective of the microscope or run laterally next to the observation beam path of the microscope, without going through the objective.

In order to lead the illumination beam path through the objective of the microscope, the illumination beam path may for example be coupled in by way of a beam splitter and be brought to overlap with the observation beam path. Alternatively, a splitter plate may be provided, with which one may fix different channels for detection and illumination. Both variants permit an illumination with an illumination axis perpendicular to the object plane and thus in principle a sharp imaging of the field diaphragm in the object plane. These means however have the disadvantage that the light intensity is reduced in the observation beam path.

For this reason, the coupling-in of light is often effected via deflection means, e.g. a prism or mirror. This is arranged outside the observation beam path, in particular laterally of this, in order to prevent a shading of the observation beam path by the deflection means. DE-B 103 32 602 discloses a light microscope with which the illumination beam path is deflected via a deflection means, such that the illumination beam path passes through the objective in its edge region. The illumination light is incident on the objective as a beam bundle which is parallel to the optical axis of the objective and is basically imaged in its focal plane. The objective is corrected for the observation beam path with regard to imaging errors. Since the observation beam path normally does not pass through the whole objective surface, but only the centric region of the objective, it is corrected less well for the illumination beam path which passes through the edge region of the objective. The illumination light may thus be imaged with aberrations onto the object plane.

With other illumination devices, the illumination light passes through the objective, however, on account of the coupling-in from the side, the axis of the illumination beam path runs at an angle to the optical axis of the objective for reasons of space.

Microscopes with an illumination beam path which does not pass through the objective but runs laterally past the objective are for example described in US-A 2001/0010592, DE-A 195 23 712 or DE-A 195 37 868. In this case, the axis of the illumination beam path likewise does not run parallel, but at an angle of about 1° to 10° to the optical axis of the objective and of the observation beam path.

An illumination with an illumination axis which is oblique (instead of perpendicular) to the object plane has the disadvantage that the field diaphragm may not be imaged sharply into the object plane over its complete area or along the complete scope of the circular diaphragm opening, and moreover is perspectively distorted. Moreover, undesired chromatic effects may occur at the edges of the illumination field. This is perceived as "unclean" optics and thus as a quality defect. Specific technical disadvantages are present if a defined, sharply bordered illumination spot is necessary for diagnostic purposes for example, or one is to image optical structures such as e.g. grid, annular structures, rectangle/gap, into the object field in a sharp manner.

US-A 2001/0010592, DE-A 195 23 712 or DE-A 195 37 868 discloses different measures, e.g. rotatable deflection mirrors, with which the focal plane of the illumination device may be adapted to the variable focal width of an objective with a zoom system arranged thereafter. However, the problem outlined above also exists with these microscopes or illumination devices. It may however be avoided by way of selecting an as small as possible coupling-in angle relative to the optical axis of the objective. This however necessitates large distances and is mostly not possible for reasons of space.

SUMMARY OF THE INVENTION

It is therefore the object of the invention to specify an illumination device and a light microscope with such an illumination device, with which the mentioned problems do not exist and the object field is illuminated in a uniform manner by way of an undistorted and as sharp as possible image of the diaphragm opening without chromatic errors.

This object is achieved by an illumination device for the illumination of an object plane of a light microscope, in particular of a stereo microscope, the light microscope having an objective with an optical axis, the illumination device comprising:

a light source, a field diaphragm, an illumination optics with at least one illumination lens, and at least one deflection means;

an illumination bean path defined by the light source, the field diaphragm, the illumination optics, and the at least one deflection means, the illumination beam path having an axis that encloses an angle $\alpha$ of greater than 0° with the optical axis of the objective;

wherein the field diaphragm, the illumination optics and the deflection means are positioned and orientated relative to one another such that a diaphragm plane defined by the field diaphragm, an illumination lens plane defined by the illumination lens, and a first image plane of the image of the field diaphragm intersect at least approximately along a common straight line, wherein the first image plane is defined as a plane of an image of the field diaphragm produced by the illumination optics without deflection by the deflection means; and wherein a second image plane of the image of the field diaphragm run ins in or parallel to the object plane, wherein the second image plane is defined as a plane of an image of the field diaphragm produced by the illumination optics and being deflected by the deflection means.

The object is further achieved by a light microscope, in particular a stereo microscope, with an objective, a tube and at least one eyepiece, further comprising an illumination device with the following features a light source, a field diaphragm, an illumination optics with at least one illumination lens, and at least one deflection means;

an illumination beam path defined by the light source, the field diaphragm, the illumination optics, and the at least one deflection means, the illumination beam path having an axis that encloses an angle α of greater than 0° with the optical axis of the objective;

wherein the field diaphragm, the illumination optics and the deflection means are positioned and orientated relative to one another such that a diaphragm plane defined by the field diaphragm, an illumination lens plane defined by the illumination lens, and a first image plane of the image of the field diaphragm intersect at least approximately along a common straight line, wherein the first image plane is defined as a plane of an image of the field diaphragm produced by the illumination optics without deflection by the deflection means; and wherein a second image plane of the image of the field diaphragm, runs in or parallel to the object plane, wherein the second image plane is defined as a plane of an image of the field diaphragm produced by the illumination optics and being deflected by the deflection means.

Advantageous further embodiments of the invention are described in the dependent claims, the description and the drawings.

The illumination device according to the invention is particularly suited for the incident illumination with a stereo microscope, for example an operation microscope for ophthalmology or neurosurgery. It is particularly suited to achieve a uniform illumination over a wide object field.

The illumination beam path of the illumination device is defined in a manner known per se by a light source, a field diaphragm, illumination optics with at least one illumination lens and at least one deflection means. The invention thus concerns an illumination device of the initially explained type, with which the axis of the illumination beam path at least in the proximity of the object plane encloses an angle α of greater than 0° with the optical axis of the objective. The object plane is thus illuminated in an oblique manner. In other regions, in particular between the objective and the observer or light source, the beam paths may be folded in a manner known per se and may thus enclose other angles, that are not important in the context of the invention.

The illumination beam path may go through the objective or run next to the objective. In the first case, the objective functions as illumination optics or represents a part of the illumination optics. In the second case, a separate illumination optics is present.

In the state of the art, the field diaphragm and the illumination optics are always perpendicular to the axis of the illumination beam path. According to the invention, the orientations and positions of these elements are at least partly modified. Two conditions are thereby fulfilled. On the one hand, the planes of the field diaphragm (diaphragm plane), of the illumination lens (illumination lens plane) and of the image of the field diaphragm produced by the illumination optics (image plane), extend at least approximately along a common straight line in the extended condition of the beam path, thus when the deflection of the illumination beam path by the deflection means is not taken into account. This virtual image plane not taking into account deflection by the deflection means is designated as first image plane. The second condition states that the image plane runs parallel to the object plane when the deflection by the deflection means is taken into account. This image plane after deflection by the deflection means is designated as second image plane.

The first condition corresponds to the Scheimpflug condition known from cartography and photography, which goes back to AT-PS 20299 from the year 1905. The Scheimpflug condition specifies under which conditions an object plane inclined relative to an imaging lens may be imaged into an image plane (e.g. onto a photographic film) in a sharp manner and without distortion. In particular, it states that the plane in which the object is sharply imaged, is inclined such that its line of intersection with the image-side main plane runs at the same distance to the optical axis as the line of intersection between the object plane and the object-side main plane. The object plane, the lens plane and the image plane for this must therefore intersect approximately in a straight line, or the main planes are to be taken into account with more complex optics. Thus here, illumination optics and field diaphragm in the extended, i.e. non-deflected condition of the illumination beam path, are arranged such that the Scheimpflug condition for a sharp imaging is fulfilled. This in particular necessitates the diaphragm plane not running parallel to the main planes of the illumination optics, thus a lens which is set obliquely with regard to the axis of the illumination means path and/or an obliquely set field diaphragm is used.

The second condition states that the illumination beam path is folded, wherein the deflection is selected such that the image of the diaphragm opening is deflected into a plane which runs in or parallel to the object plane. It is possible by way of this, to arrange the illumination device laterally of the observation beam path, i.e. with axes which are perpendicular to one another, and to deflect the illumination beam towards the object plane without compromising the quality. It is not necessary to minimize the angle α between the axes of the illumination beam path and the observation beam path, by which means a good deal of freedom exists with regard to design.

As a whole, a sharp imaging of the field diaphragm in or parallel to the object plane is achieved with surprisingly simple means by way of the illumination device according to the invention, despite the oblique incidence of the illumination beam path or its optical axis onto the object plane. Chromatic errors and a distortion of the light field are avoided. This also permits the undistorted, precise imaging of structures onto the object plane, e.g. grid net, ring, gap. Moreover, the angle which the illumination beam path encloses with the observation beam path, may be increased without compromising the quality, by which means a greater design freedom arises.

The advantages of the invention are obvious with microscopes with an illumination beam path which is led next to the objective at an angle to its optical axis and which has its own illumination optics which are independent of the objective. The advantage is likewise evident with microscopes, with which the illumination light is obliquely incident onto the objective. However, on account of the invention, an improvement of the imaging quality is also achieved with microscopes with an illumination beam path which is led parallel to the optical axis through edge regions of the objective, as is described for example in DE-B 103 32 602.

The second image plane is located in a constant position relative to the objective or object plane with a fixed position and orientation of the field diaphragm. The second image plane runs parallel to or in the object plane. With an objective with a constant focal width, the parameters of the illumination device are preferably selected such that the image of the field diaphragm is deflected precisely into the focal plane (object plane).

With an objective with a variable focal width, the parameters of the illumination device are preferably selected such that the image of the field diaphragm is deflected into a plane which corresponds to an average focal width of the objective. The light field is therefore imaged in an essentially uniformly sharp manner within the focal depth range, even with changes of the focal width.

In a further advantageous embodiment of the invention, the position of the second image plane is variable for adaptation to different objective focal widths. This may for example be effected by way of displacing the illumination lens in the axial direction of the illumination beam path, by which means the distance between the diaphragm image and the field diaphragm changes. The mentioned conditions may be fulfilled by way of tracking the orientation (angle to the axis of the illumination beam path) and/or position (position along the extended axis of the illumination beam path) of the field diaphragm and/or the orientation of the lens and/or the orientation of the mirror, and an image which is orientated parallel to the original image is produced in the changed distance to the objective. The adaptation of these parameters of the illumination device is preferably initiated by a control device, which receives the signals via the setting of the zoom system and produces actuating signals for actuating elements which determine the orientation and/or the position of the components mentioned above.

The invention has particular advantages with operation microscopes, with which the object field is to be illuminated via a defined area, often a circle area, in an as homogeneous as possible manner and with a sharp edge. The aperture opening of the illumination aperture should therefore be imaged into the object plane in a sharp manner in order to illuminate the object over the whole surface.

BRIEF DESCRIPTION OF THE DRAWINGS

Embodiment examples of the invention are represented in the drawings and described hereinafter. There are shown purely schematically in.

DETAILED DESCRIPTION OF THE INVENTION

Figure 1:
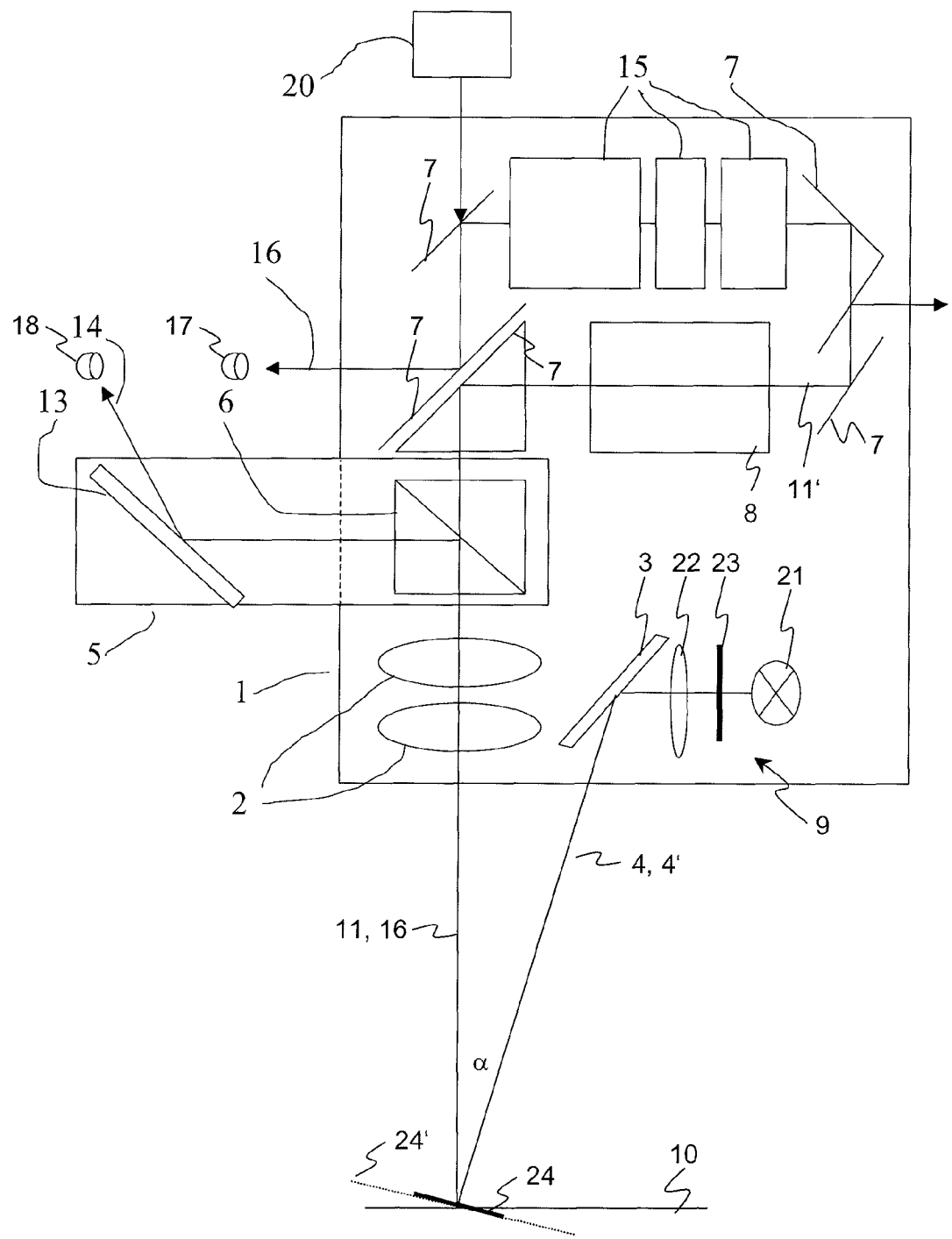
FIG. 1 shows the construction of a light microscope with a conventional illumination device for the incident illumination of an object plane.

The microscope which is represented in FIG. 1, is basically known from DE-B 102 55 961 (corresponding to U.S. Pat. No. 6,982,825) and here is only described to the extent that it is necessary for the understanding of the invention, otherwise DE-B 102 55 961 is referred to (U.S. Pat. No. 6,982,825 is incorporated herein by reference in its entirety). The stereo microscope comprises a main microscope 1 and an assistant microscope 5. With regard to the represented microscope, it is in particular the case of an ophthalmologic microscope or one for neurosurgery.

The stereo microscope, as essential optical components, comprises a main objective 2, a zoom system 8 and at least one (not represented) binocular tube with eyepieces. The optical axis 11 of the main objective 2 runs vertically and is perpendicular to the object plane 10. The observation beam path 16 is deflected several times in each case by 90° by way of deflection elements 7, so that a middle axis 11' of the zoom system 8 runs in a horizontal manner. The observation beam path 16 finally (via the binocular tube, which is not shown in detail here) reaches the main observer 17. Optical addition components 15, e.g. a superimposed data device 20, inverter device, laser-shutter device or optical splitters are provided in the observation beam path 16. The zoom system 8 and the addition components 15 may be incorporated by way of the horizontal deflection of the observation beam path 16, without the vertical construction height of the stereo microscope thereby being enlarged in an ergonomically unfavourable manner.

As an option, a further beam splitter 6 is provided between the main objective 2 and the first deflection element 7, which divides the main observation beam path 16 along the axis 11 of the main objective 2 into two part beam paths 16, 14. A first transmitted part beam path 16 corresponds to the already discussed beam path which runs along the axis 11' of the zoom system 8 after the deflection. The further part beam path 14 is mirrored out of the main observation beam path as an assistant observation beam path and is led via a further deflection element 13 into an assessment binocular tube which is not represented, and from there into the eye of the second observer 18. The assistant microscope 5 may for example be separable from the main microscope 1 at a mechanical separation location which is represented as a dashed line in FIG. 1.

The illumination device 9 in the present example is arranged laterally next to the main objective 2 within the microscope housing. It has an illumination beam path 4 which runs next to the main objective 2, without passing through the main objective 2. The illumination beam path 4 is fixed by a light source 21 in combination with a field diaphragm 23, illumination optics shown schematically in the form of a simple lens 22, and a deflection means 3 such as a prism or mirror. The circular opening in the field diaphragm 23, which is not shown here, is thus imaged into the region of the object plane 10 and is directed onto the object 24 to be observed.

The optical axis 11 of the objective 2 encloses an angle α of 1° to 10° with an axis 4' of the illumination beam path 4 in the region close to the object. The field diaphragm 23 is orientated perpendicular to the axis 4' of the illumination beam path 4. The image 24 of the field diaphragm 23 is therefore sharp only in one plane 24' which is perpendicular to the axis 4'. This image plane 24' is inclined with respect to the object plane 10 by way of the oblique deflection of the illumination beam path 4 or the oblique incidence onto the object plane 10. Thus the field diaphragm 23 is not sharp over its complete region, but is blurred and is projected onto the object plane 10 possibly with chromatic effects at the edges.

Figure 2:
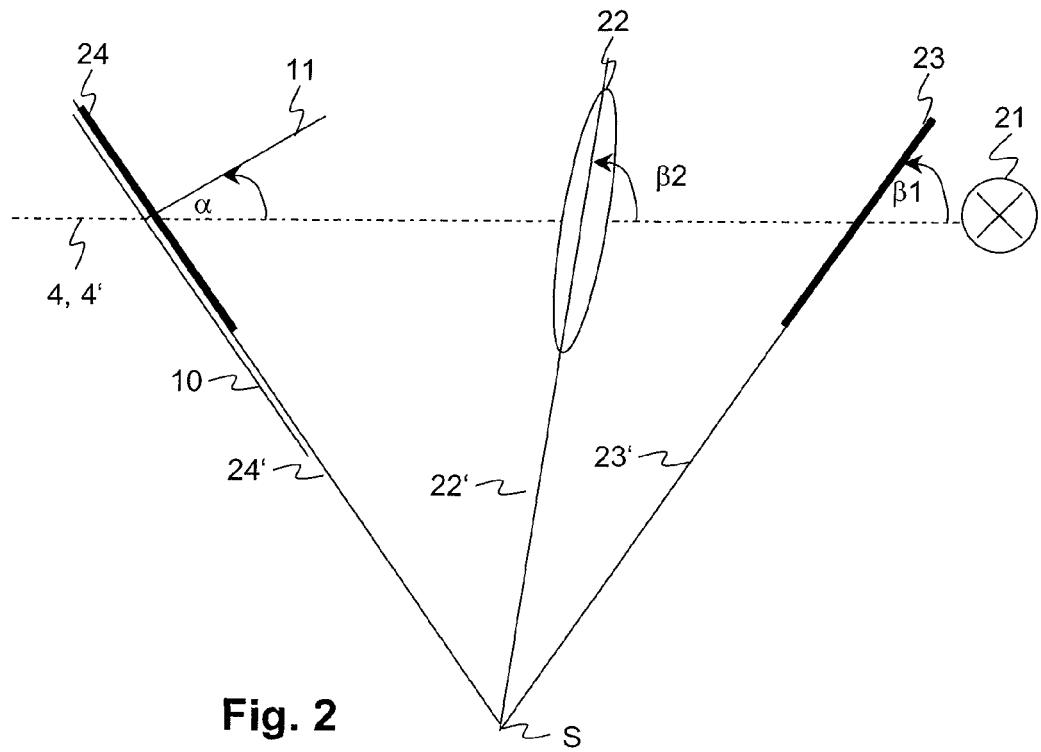
FIG. 2 shows an illumination device of the present invention with an extended illumination beam path for the illustration of the Scheimpflug condition.
Figure 3:
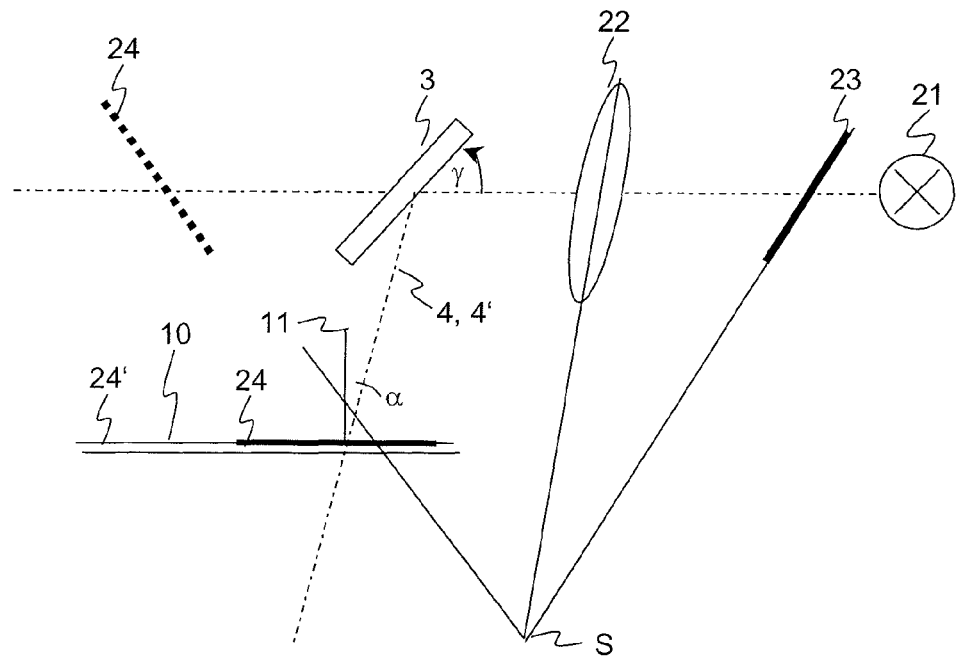
FIG. 3 shows the illumination device with an illumination beam path which is deflected by a deflection means, for the illustration of the illumination in or parallel to the object plane.

FIGS. 2 and 3 explain how these undesired imaging errors in the illumination beam path 4 are alleviated according to the invention, in a simple manner. FIG. 2 schematically and in a manner which is not true to scale, shows the extended condition of the illumination beam path 4. The object plane 10 in which a sharp image 24 of the field aperture 23 is to be produced, is inclined with respect to the axis 4' of the illumination beam path 4, wherein its surface normal, thus the optical axis 11 of the objective 2, encloses the above mentioned angle α with the axis 4' of the illumination beam path 4. The field diaphragm 23 and/or the illumination lens 22 is set obliquely with respect to the axis 4', in order to bring the image plane 24' to correspond with the object plane 10. The diaphragm plane 23' encloses an angle β1 of smaller than 90° with the axis 4' of the illumination beam path 4. Alternatively or additionally, the illumination lens plane 22' encloses an angle β2 with the axis 4' of the illumination beam path 4. This is preferably smaller or equal to 90° and larger than β1. The angles β1, β2 are selected according to the Scheimpflug condition, such that the planes 22', 23' and 10/24' intersect at least approximately along a common line of intersection S. Instead of the lens plane 22', the main planes are to be taken into account with more complex illumination optics, as explained beforehand.

FIG. 3 shows the deflection of the image 24 of the field aperture from the original non-deflected first image plane 24' (cf. FIG. 2, here drawn dashed) by way of the deflection means 3, into a second image plane 24" which runs parallel to the actual object plane 10. The axis 4' of the illumination beam path 4, which is deflected by the deflection means 3, now runs at an angle α to the vertical or to the optical axis 11 of the objective 2. The angle γ at which the deflection means 3 must be arranged in the beam path 4, in order to align the image plane 24' parallel to the object plane 10, may be determined by way of simple geometric considerations.

It is also possible for the deflection means 3 which is used for folding up the illumination beam path 4 to be located between the lens 22 and the field diaphragm 23. This case is present for example when the objective 2 is used as illumination optics or a part thereof.

Figure 4:
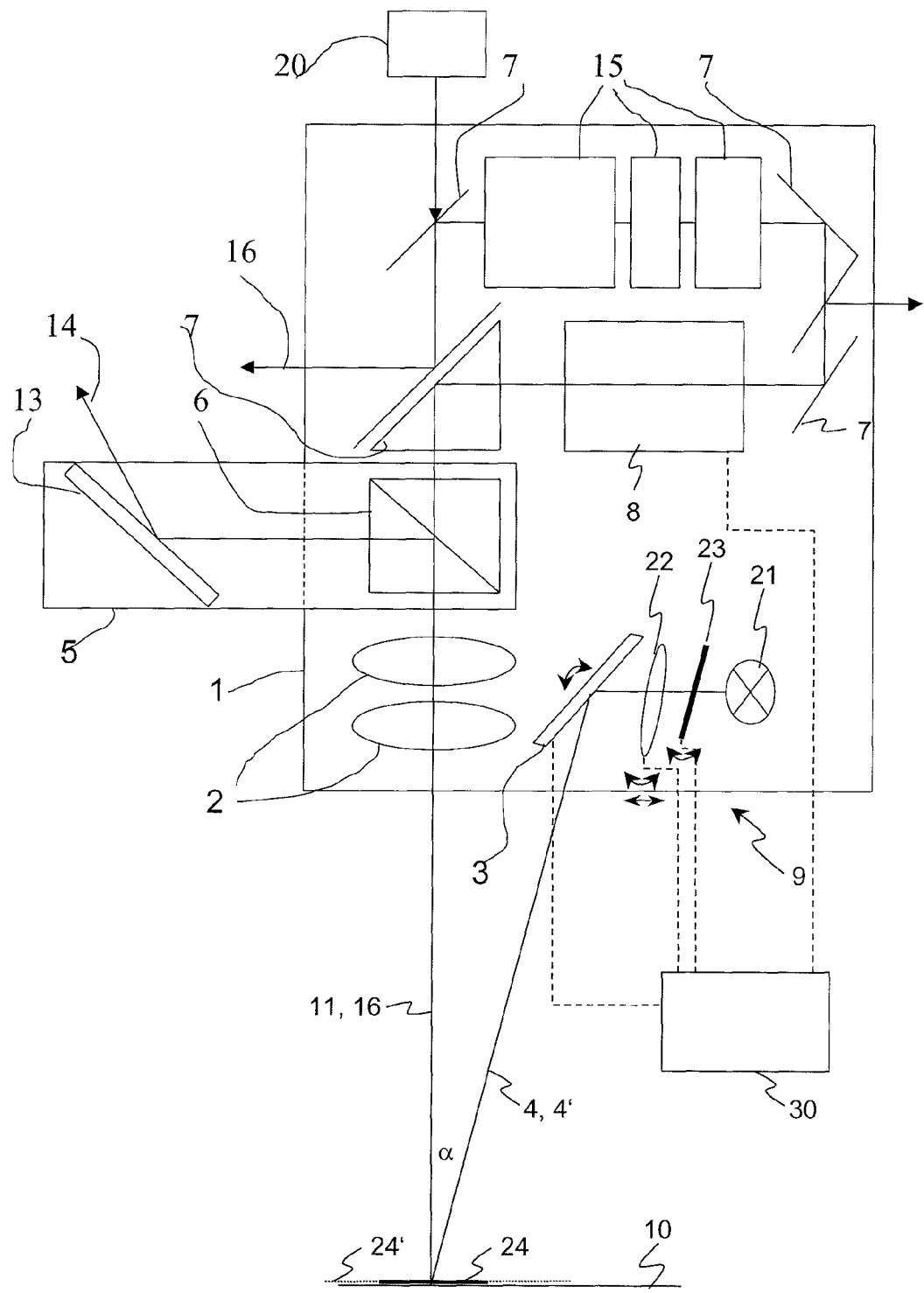
FIG. 4 shows the microscope of FIG. 1 with an illumination device according to the invention.

FIG. 4 shows the microscope of FIG. 1 with an illumination device 9 according to the invention and otherwise a construction which is identical to FIG. 1. The illumination device 9 is basically constructed as in FIG. 3.

The distance of the image plane 24' to the objective 2 is set by the mutual distances and orientations of the light source 21, of the field diaphragm 23, of the illumination optics 22 and of the deflection means 3.

In order to adapt this distance to the actual focal width which is varied by the zoom system, at least individual ones of the mentioned distances and orientations are variable in an advantageous further formation of the invention. This is indicated by arrows at the respective components. For example, the distance between the illumination optics 22 and the field diaphragm 23 is variable in the axial direction of the illumination beam path 4, in order to produce the image 24 at a variable distance to the field diaphragm 23. The orientation of the diaphragm plane 23' and/or the illumination lens 22 is preferably variable, in order again to fulfill the Scheimpflug condition in such a case. Moreover, the orientation of the deflection means 3 is preferably variable, in order to align the second image plane 24" parallel again to the object plane 10.

Preferably, a control device 30 is present for the automatic adaptation to the actual objective focal width. This, from the zoom system 8, obtains a control signal, on account of which the adaptation of the mentioned parameters of the illumination device may be determined. Respective control signals are then transferred to actuating elements which are connected to the field diaphragm 23, the illumination optics 22 and/or the deflection means 3.

The described arrangement may also be applied in an analog manner such that the illumination beam path passes through the objective of the microscope.

What is claimed is:

1. An illumination device for the illumination of an object plane of a light microscope, the light microscope including an objective having an optical axis, the illumination device comprising:
    a light source, a field diaphragm, an illumination optics including at least one illumination lens, and at least one deflection means; and
    an illumination beam path defined by the light source, the field diaphragm, the illumination optics, and the at least one deflection means, the illumination beam path having an axis that encloses an angle α of greater than 0° with the optical axis of the objective;
    wherein the field diaphragm, the illumination optics and the deflection means are positioned and orientated relative to one another such that a diaphragm plane defined by the field diaphragm, an illumination lens plane defined by the illumination lens, and a first image plane of an image of the field diaphragm intersect at least approximately along a common straight line, wherein the first image plane is defined as a plane of an image of the field diaphragm produced by the illumination optics without deflection by the deflection means; and
    wherein a second image plane of the image of the field diaphragm runs in or parallel to the object plane, wherein the second image plane is defined as a plane of an image of the field diaphragm produced by the illumination optics and being deflected by the deflection means.

2. An illumination device according to claim 1, wherein the illumination beam path passes through the objective.

3. An illumination device according to claim 1, wherein the illumination beam path runs next to the objective.

4. An illumination device according to claim 1, wherein the deflection means is arranged in the illumination beam path between the illumination optics and the first image plane.

5. An illumination device according to claim 1, wherein the deflection means is arranged in the illumination beam path between the field diaphragm and the illumination optics.

6. An illumination device according to claim 1, wherein the diaphragm plane encloses an angle β1 of less than 90° with the axis of the illumination beam path.

7. An illumination device according to claim 6, wherein the angle β1 is variable.

8. An illumination device according to claim 6, wherein the illumination lens plane encloses an angle β2 with the axis of the illumination beam path, for which 90°≧β2>β1 applies.

9. An illumination device according to claim 8, wherein the angle β2 is variable.

10. An illumination device according to claim 1, wherein the field diaphragm, the illumination optics and the deflection means are positioned and orientated such that the distance of the second image plane to the objective corresponds to an average focal width of the objective.

11. An illumination device according to claim 1, wherein at least one of the field diaphragm, the illumination optics and the deflection means is variable in at least its position or its orientation such that the distance of the second image plane to the objective is variable.

12. An illumination device according to claim 11, wherein a distance between the illumination optics and the field diaphragm is variable in an axial direction of the illumination beam path to produce the image of the field diaphragm at a variable distance relative to the field diaphragm.

13. An illumination device according to claim 11, wherein the orientation of the field diaphragm or the illumination optics is variable to fulfill the Scheimpflug condition.

14. An illumination device according to claim 11, wherein the orientation of the deflection means is variable to align the second image plane parallel to or in the object plane.

15. An illumination device according to claim 11, further comprising a control device connected to the field diaphragm, the illumination optics and the deflection means which adjusts the field diaphragm, the illumination optics and/or the deflection means in dependence on a focal width of the objective, such that the second image plane lies essentially in the object plane.

16. A light microscope comprising:

an objective having an optical axis;

a viewing tube supporting at least one eyepiece;

an illumination device including a light source, a field diaphragm, an illumination optics having at least one illumination lens, and at least one deflection means;

an illumination beam path defined by the light source, the field diaphragm, the illumination optics, and the at least one deflection means, the illumination beam path having an axis that encloses an angle $\alpha$ of greater than 0° with the optical axis of the objective;

wherein the field diaphragm, the illumination optics and the deflection means are positioned and orientated relative to one another such that a diaphragm plane defined by the field diaphragm, an illumination lens plane defined by the illumination lens, and a first image plane of the image of the field diaphragm intersect at least approximately along a common straight line, wherein the first image plane is defined as a plane of an image of the field diaphragm produced by the illumination optics without deflection by the deflection means; and wherein a second image plane of the image of the field diaphragm runs in or parallel to the object plane, wherein the second image plane is defined as a plane of an image of the field diaphragm produced by the illumination optics and being deflected by the deflection means.

17. A light microscope comprising:

an objective having an optical axis;

a viewing tube supporting at least one eyepiece;

an illumination device including a light source, a field diaphragm, an illumination optics having at least one illumination lens, and at least one deflection means;

an illumination beam path defined by the light source, the field diaphragm, the illumination optics, and the at least one deflection means, the illumination beam path having an axis that encloses an angle $\alpha$ of greater than 0° with the optical axis of the objective;

wherein the field diaphragm, the illumination optics and the deflection means are positioned and orientated relative to one another such that a diaphragm plane defined by the field diaphragm, an illumination lens plane defined by the illumination lens, and a first image plane of the image of the field diaphragm intersect at least approximately along a common straight line, wherein the first image plane is defined as a plane of an image of the field diaphragm produced by the illumination optics without deflection by the deflection means;

wherein a second image plane of the image of the field diaphragm runs in or parallel to the object plane, wherein the second image plane is defined as a plane of an image of the field diaphragm produced by the illumination optics and being deflected by the deflection means;

wherein at least one of the field diaphragm, the illumination optics and the deflection means is variable in at least its position or its orientation such that the distance of the second image plane to the objective is variable; and wherein the orientation of the field diaphragm or the illumination optics is variable to fulfill the Scheimpflug condition.

* * * * *